US009059764B2

(12) United States Patent
Winters et al.

(10) Patent No.: US 9,059,764 B2
(45) Date of Patent: Jun. 16, 2015

(54) METHOD OF SELECTING RECEIVE ANTENNAS FOR MIMO SYSTEMS

(71) Applicant: AT&T Intellectual Property II, LP, Atlanta, GA (US)

(72) Inventors: Jack Harriman Winters, Middletown, NJ (US); Yang-Seok Choi, Liberty Lakes, WA (US); Byoung-Jo J. Kim, Morganville, NJ (US); Andreas Molisch, North Plainfield, NJ (US); Moe Z. Win, Cambridge, MA (US); Hui Lo, Marlboro, NJ (US)

(73) Assignee: AT&T INTELLECTUAL PROPERTY II, LP, Atlanta, GA (US)

( * ) Notice: Subject to any disclaimer, the term of this patent is extended or adjusted under 35 U.S.C. 154(b) by 0 days.

(21) Appl. No.: 14/252,467

(22) Filed: Apr. 14, 2014

(65) Prior Publication Data

US 2014/0307837 A1    Oct. 16, 2014

Related U.S. Application Data

(63) Continuation of application No. 12/912,399, filed on Oct. 26, 2010, now Pat. No. 8,725,102, which is a continuation of application No. 11/897,312, filed on Aug. 30, 2007, now Pat. No. 7,844,240, which is a continuation of application No. 11/321,785, filed on Dec. 29, 2005, now Pat. No. 7,283,798, which is a continuation of application No. 10/324,168, filed on Dec. 19, 2002, now Pat. No. 7,006,810.

(51) Int. Cl.
*H04B 1/06* (2006.01)
*H04B 7/00* (2006.01)
*H04B 7/08* (2006.01)
*H04B 1/10* (2006.01)

(52) U.S. Cl.
CPC ............ *H04B 7/0854* (2013.01); *H04B 7/0874* (2013.01); *H04B 1/1027* (2013.01)

(58) Field of Classification Search
CPC ..... H04W 16/28; H04W 88/08; H01Q 1/246; H04B 1/12; H04B 1/126; H04B 1/18; H04B 7/0817; H04B 7/082; H04B 7/0837; H04B 7/084; H04B 7/0857; H04B 7/0865; H04B 17/006; G01R 29/26
USPC ................ 455/562.1, 561, 278.1, 101, 575.7, 455/132–140, 272–279.1, 226.3
See application file for complete search history.

(56) References Cited

U.S. PATENT DOCUMENTS

| | | | |
|---|---|---|---|
| 6,744,864 B1 | 6/2004 | Garfinkel | |
| 6,774,864 B2 * | 8/2004 | Evans et al. | 343/853 |
| 7,283,798 B1 * | 10/2007 | Winters et al. | 455/277.1 |
| 7,844,240 B1 * | 11/2010 | Winters et al. | 455/277.1 |
| 7,933,629 B2 * | 4/2011 | Kwon et al. | 455/562.1 |

(Continued)

*Primary Examiner* — Edward Urban
*Assistant Examiner* — Rui Hu
(74) *Attorney, Agent, or Firm* — Guntin & Gust, PLC; Ralph Trementozzi (57) ABSTRACT

A method of performing receive antenna selection is presented. The method executes a determination operation for a set of receive antennas, determines a maximum result of the determination operation for two of the antennas, eliminates one of the two antennas from the set of antennas, and repeats the determination and elimination process until only a predetermined number of antennas remain in the set. The signals from these remaining antennas are then processed. The present invention reduces receiver complexity and cost.

20 Claims, 4 Drawing Sheets

(56) References Cited

U.S. PATENT DOCUMENTS

| | | | |
|---|---|---|---|
| 2003/0035491 A1* | 2/2003 | Walton et al. | 375/267 |
| 2003/0083016 A1* | 5/2003 | Evans et al. | 455/67.1 |
| 2003/0162519 A1* | 8/2003 | Smith et al. | 455/277.1 |
| 2005/0003863 A1* | 1/2005 | Gorokhov | 455/562.1 |

* cited by examiner

METHOD OF SELECTING RECEIVE ANTENNAS FOR MIMO SYSTEMS

CROSS-REFERENCE TO RELATED APPLICATION(S)

This application is a continuation of U.S. patent application Ser. No. 12/912,399 filed Oct. 26, 2010 by Winters et al., entitled "Method of Selecting Receive Antennas for MIMO Systems," which is a continuation of U.S. patent application Ser. No. 11/897,312 filed Aug. 30, 2007 by Winters et al., entitled "Method of Selecting Receive Antennas for MIMO Systems," (now U.S. Pat. No. 7,844,240) which is a continuation of U.S. patent application Ser. No. 11/321,785 filed Dec. 29, 2005 by Winters et al., entitled "Method of Selecting Receive Antennas for MIMO Systems," (now U.S. Pat. No. 7,283,798) which is a continuation of U.S. patent application Ser. No. 10/324,168 filed Dec. 19, 2002 by Winters et al., entitled "Method of Selecting Receive Antennas for MIMO Systems," (now U.S. Pat. No. 7,006,810). All sections of the aforementioned application(s) are incorporated herein by reference in its entirety.

FIELD OF THE DISCLOSURE

The present invention relates generally to systems having a plurality of receive antennas and, more particularly, to selecting a number of receive antennas from the plurality of receive antennas and processing signals from the selected antennas.

BACKGROUND

Multiple Input Multiple Output (MIMO) systems are known to those of ordinary skill in the art. In a MIMO system, a stream of bits is demultiplexed into a predetermined number of substreams. Each substream is sent out over a different antenna. The signals get mixed through the wireless channel. Signal processing is applied to the signals at the set of receive antennas to unscramble the data. The unscrambled data streams are multiplexed into the original high rate bit stream. In such systems, only a portion (e.g., if three substreams were used, only one third) of the spectrum, which would normally have been required is actually used.

Orthogonal Frequency Division Multiplexing (OFDM) is known to those of ordinary skill in the art. OFDM is a modulation technique useful for transmitting large amounts of data over a radio wave. The OFDM technique modulates multiple carriers at different frequencies with the same symbol rate such that the signals can be recovered without mutual interference. The receiver acquires the signal, digitizes the acquired signal, and performs a Fast Fourier Transform (FFT) on the digitized signal to get back to the frequency domain. The modulation is then recovered on each carrier. This technique results in a large amount of data being transmitted in a relatively small bandwidth.

The MIMO systems provide high spectral efficiency. Multiple transmit multiple receive antenna links increase the capacity of MIMO and MIMO OFDM systems. However, the implementation of high spectral efficiency is difficult due to the complexity of the systems and the resultant high costs.

It would, therefore, be desirable to provide a method of selecting receive antennas for MIMO and MIMO OFDM systems, which reduces the cost and complexity of the MIMO and MIMO OFDM receivers.

BRIEF DESCRIPTION OF THE DRAWINGS

Reference will now be made to the accompanying drawings, which are not necessarily drawn to scale, and wherein.

DETAILED DESCRIPTION

Figure 1:
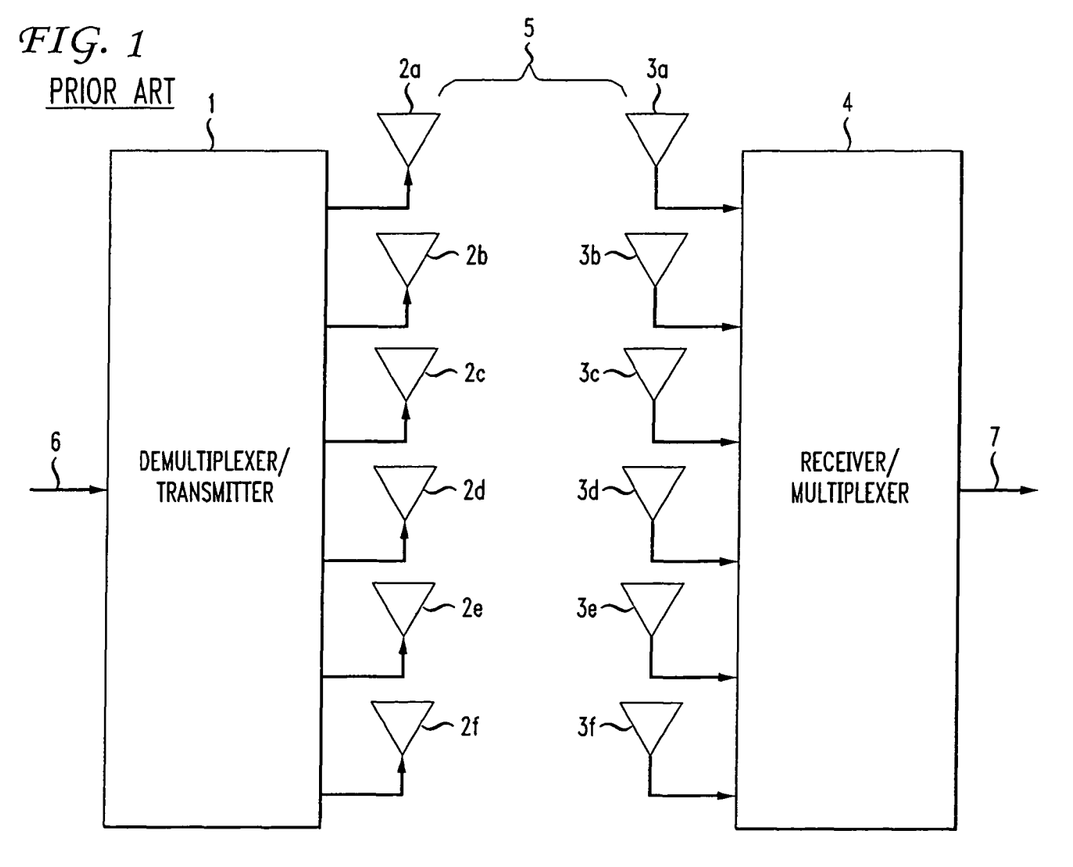
FIG. 1 is a block diagram of a portion of a MIMO/MIMO OFDM system.

Referring to FIG. 1, a prior art MIMO/MIMO OFDM system is shown. In the MIMO/MIMO OFDM system, a stream of bits 6 is demultiplexed by demultiplexer/transmitter 1 into a predetermined number of substreams. Each substream is sent out over a different transmit antenna 2a-2f by demultiplexer transmitter 1. The signals transmitted by the transmit antennas 2a-2f get mixed while traveling through the wireless channel 5. The signals are received by receive antennas 3a-3f. The received signals are coupled from the receive antennas 3a-3f to receiver/multiplexer 4. Signal processing is applied to the signals at the set of receive antennas to unscramble the data. The unscrambled data streams are then demultiplexed into a high rate bit stream 7, which is a copy of the high rate bit stream 6.

As described above, MIMO and MIMO OFDM systems require relatively complex and expensive receivers. A method is presented by which performing receive antenna selection is provided, thereby reducing the complexity and cost of the receiver in MIMO and MIMO OFDM systems.

It is known that the incremental gain of additional receive antennas in MIMO and MIMO ODFM systems is negligible when the number of receive antennas K is larger than the number of transmit antennas M. Hence, through receive antenna selection the reduced receiver complexity is possible without significant loss in the capacity of the system. There are several selection methods based on the capacity or the signal-to-interference and noise power ratio (SINR). These approaches require $$\binom{K}{S}$$

computations of their own criteria, i.e., the capacity or the SINR, where K is the number of receive antennas and S represents the number of selected antennas.

A MIMO system with K receive antennas and M transmit antennas will be used to describe the present invention. In slowly time-varying flat fading channel (also known as a Rayleigh fading channel) the received vector can be modeled as:

$$y = x + w = Hs + w \qquad \text{Equation (1)}$$

where y is the received vector with size K×1, x is the data component of y, K by M matrix H represents the channel, M×1 vector s is the transmitted vector with an identity correlation matrix and w is the noise vector.

Each element in channel matrix H is an independent complex Gaussian random variable with a variance equal to unity. The transmitted vector s is normalized such that $Tr\{ss^H\}=P$ where $s^H$ is the hermitian transpose of vector s, and P is the total transmitted power. The entries of w are independent and identically distributed, and are defined by $w(i) \sim N(0, \sigma^2)$ where N indicates normal distribution and $\sigma^2$ is the noise power). The entries are independent over time and i.

S receive antennas are selected out of K antennas according to several criteria. By checking the capacity, S receive antennas are chosen out of K antennas in a way that the capacity is maximized. Alternatively, by examining the SINR, which is directly related to bit or symbol error rate, the selection of S receive antennas out of K antennas can also be performed.

In one embodiment, the receiver selects S antennas that allow a maximization of the capacity $$C_s = \max_{S(\tilde{H})} \log_2 \left| I_h + \frac{\rho}{M} \tilde{H} \tilde{H}^H \right| \quad \text{Equation (2)}$$

where $I_s$ is the S×S identity matrix, $$\rho = \frac{P}{\sigma^2}$$

is the mean signal-to-noise ratio (SNR) per receiver branch, reduced matrix $\tilde{H}$ is created by deleting K-S rows of channel matrix H, and $S(\tilde{H})$ represents the set of all possible reduced matrices $\tilde{H}$.

Since there are $$\binom{K}{S}$$

possible reduced channel matrices $\tilde{H}$, the capacity is evaluated as many times as $$\binom{K}{S}.$$

The determinant in Equation (2) can be written as $$\left| I_h + \frac{\rho}{M} \tilde{H} \tilde{H}^H \right| = \prod_{k=1}^{r} \left( 1 + \frac{\rho}{M} |\lambda_k|^2 \right) \quad \text{Equation (3)}$$

where r is the rank of the reduced channel matrix $\tilde{H}$ and $\lambda_k$ is the singular value of reduced channel matrix $\tilde{H}$. The rank and the singular values are maximized for the maximum capacity.

There may be a case in which there are two rows of the channel matrix H, which are identical. Clearly only one of these rows should be selected in reduced channel matrix $\tilde{H}$. Since these two rows carry the same information, either row of these two rows can be deleted without losing any information about the transmitted vector. In addition if the rows have different powers (i.e., magnitude square of the norm of the row), then the lower power row can be deleted.

When there are no identical rows then the next two rows whose correlation is the next highest are chosen for the deletion. In this manner the reduced channel matrix $\tilde{H}$ whose rows are maximally uncorrelated and have maximum powers are obtained. This leads to several methods for determining the highest correlation rate among the set of receive antennas.

A first method (method 1) for determining the highest correlation rate is performed in accordance with the formula:

$$\text{Corr}(k, l) = \left| \left\langle \frac{h_k}{\|h_k\|^2}, h_l \right\rangle \right| \quad \text{Equation (4)}$$

where X={1, 2, . . . K}, $h_k$ is the $k^{th}$ row of channel matrix H, $h_l$ is the $l^{th}$ row of channel matrix H, k≠l, and k, l∈X.

The correlation rate is determined by taking the absolute value of the inner product of the two arguments. The result is the square root of the sum of the products of each value in the h vectors.

A second method (method 2) for determining the highest correlation rate is performed in accordance with the formula:

$$\text{Corr}(k, l) = \left| \left\langle \frac{h_k}{\|h_k\|}, h_l \right\rangle \right| \quad \text{Equation (5)}$$

where X={1, 2, . . . K}, $h_k$ is the $k^{th}$ row of channel matrix H, $h_l$ is the $l^{th}$ row of channel matrix H, k≠l, and k, l∈X.

Another method (method 3) for determining the highest correlation rate is performed in accordance with the formula:

$$\text{Corr}(k, l) = \left| \left\langle \frac{h_k}{\|h_k\|}, \frac{h_l}{\|h_l\|} \right\rangle \right| \quad \text{Equation (6)}$$

where X={1, 2, . . . K}, $h_k$ is the $k^{th}$ row of channel matrix H, $h_l$ is the $l^{th}$ row of channel matrix H, k>l, and k, l∈X.

Yet another method (method 4) for determining the highest correlation rate is performed in accordance with the formula:

$$\text{Corr}(k,l) = |\langle h_k, h_l \rangle| \quad \text{Equation (7)}$$

where X={1, 2, . . . K}, $h_k$ is the $k^{th}$ row of channel matrix H, $h_l$ is the $l^{th}$ row of channel matrix H, k>l, and k, l∈X.

Method 4 is the least complex method to implement. The above methods do not require the SNR value and are based mainly on the correlation $E\{y_k \cdot y_l^+\}$ where E is the expected value of the inner product of two output vector y's average, of the sum of the products of each value in y's.

As an alternative method when the SNR is available, the mutual information between received vector $Y_k$ and received vector $Y_l$ is used. The zero-valued mutual information means the received vector $Y_k$ and the received vector $Y_l$ carry totally different information. This occurs when the corresponding channel vector $h_k$ and $h_l$ are orthogonal. The channel vector $h_k$ is defined as the k-th row of the channel matrix H. If the mutual information is maximum, the received vector $y_k$ and the received vector $y_l$ carry the same information so that one of them can be deleted.

The mutual information is defined as $$I(y_k; y_l) = H(y_k) + H(y_l) - H(y_k, y_l) \quad \text{Equation (8)}$$

In the MIMO system the mutual information can be written as $$I(y_k; y_l) = \log \frac{\left( \|h_k\|^2 \frac{\rho}{M} + 1 \right) \left( \|h_l\|^2 \frac{\rho}{M} + 1 \right)}{\left( \|h_k\|^2 \frac{\rho}{M} + 1 \right) \left( \|h_l\|^2 \frac{\rho}{M} + 1 \right) - |\langle h_k, h_l \rangle|^2 \frac{\rho^2}{M^2}} \quad \text{Equation (9)}$$

Since the mutual information is bounded as following $$0 \leq I(y_k; y_l) \leq \min(H(y_k), H(y_l)) \quad \text{Equation (10)}$$

the normalized mutual information is defined below as $$I_0(y_k; y_l) = \frac{I(y_k; y_l)}{\min(H(y_k), H(y_l))} \quad \text{Equation (11)}$$

as a measure of how close the two random variables are. The entropy calculation of the received vector $y_k$ requires both the signal and noise power, whereas the mutual information needs the SNR only.

This can be overcome as follows. The scaling of receive vector $y_k$ to $c \cdot y_k$, where the non-zero real number c is chosen in the way that the noise variance is equal to one, will not normalize mutual information. The scaling does not change the mutual information while the entropy of $c \cdot y_k$ becomes $$H(c \cdot y_k) = \quad \text{Equation (12)}$$
$$\log\left(c^2 \|h_k\|^2 \frac{P}{M} + c^2 \sigma^2\right) = \log\left(\|h_k\|^2 \frac{\rho}{M} + 1\right)$$

The normalized mutual information is redefined as $$I_0(y_k; y_l) = \frac{I(c \cdot y_k; c \cdot y_l)}{\min(H(c \cdot y_k), H(c \cdot y_l))} \quad \text{Equation (13)}$$

Then, the normalized mutual information becomes $$I_0(y_k; y_l) = \frac{I(y_k; y_l)}{\min\left(\log\left(\|h_k\|^2 \frac{\rho}{M} + 1\right), \log\left(\|h_l\|^2 \frac{\rho}{M} + 1\right)\right)} \quad \text{Equation (14)}$$

The procedure for calculating the normalized mutual information (method 5) is done in accordance with the formula:

$$I_0(y_k; y_l) \quad \text{Equation (15)}$$

where $X = \{1, 2, \ldots K\}$, k>l, and k, l∈X.

The mutual information based technique can also be applied to the data component $x_k$ in order to avoid requiring the SNR value. Then, the mutual information between the data component $x_k$ and the data component $x_l$ is $$I(x_k; x_l) = \log \frac{\|h_k\|^2 \|h_l\|^2}{\|h_k\|^2 \|h_l\|^2 - |\langle h_k, h_l \rangle|^2}. \quad \text{Equation (16)}$$

Similarly, the normalized mutual information is defined below as $$I_0(x_k; x_l) = \quad \text{Equation (17)}$$
$$\frac{I(c \cdot x_k; c \cdot x_l)}{\min(H(c \cdot x_k), H(c \cdot x_l))} = \frac{I(x_k; x_l)}{\min(\log\|h_k\|^2, \log\|h_l\|^2)}$$

The procedure for calculating the normalized mutual information (method 6) is done in accordance with the formula:

$$I_0(x_k; x_l) \quad \text{Equation (18)}$$

where $X = \{1, 2, \ldots K\}$, k>l, and k, l∈X.

Having described receiver antenna selection techniques with respect to MEMO systems, the following describes receiver selection techniques with respect to MIMO OFDM systems.

In a MIMO OFDM system with N subcarriers, the channel matrix under time invariant channel can be modeled as a block diagonal matrix $$H = \begin{bmatrix} H(1) & 0 & \ldots & 0 \\ 0 & H(2) & 0 & \vdots \\ \vdots & 0 & \ddots & 0 \\ 0 & \ldots & 0 & H(N) \end{bmatrix} \quad \text{Equation (19)}$$

where $$H(n) = \begin{bmatrix} H_{11}(n) & H_{12}(n) & \ldots & H_{1M}(n) \\ H_{21}(n) & H_{22}(n) & \ldots & H_{2M}(n) \\ \vdots & \vdots & \ddots & \vdots \\ H_{K1}(n) & H_{K2}(n) & \ldots & H_{KM}(n) \end{bmatrix}$$

represents the channel matrix between K receive and M transmit antennas at subcarrier n. The capacity becomes $$C = \sum_{u=1}^{N} \log_2 \left| I_k + \frac{\rho}{M} H(n) H^H(n) \right|. \quad \text{Equation (20)}$$

In the correlation based methods (methods 1-4 described above for a MIMO system) the correlation must now be averaged over the subcarriers to provide the same function for a MIMO OFDM system. For example, the correlation formula used in method 1 for a MIMO system is modified to account for the subcarriers to become method 7, which is performed in accordance with the formula:

$$\text{Corr}(k, l) = \left| \sum_{n=1}^{N} \left\langle \frac{h_k(n)}{\|h_k(n)\|^2}, h_l(n) \right\rangle \right| \quad \text{Equation (21)}$$

where $X = \{1, 2, \ldots K\}$, $h_k(n)$ is the $k^{th}$ row of channel matrix at subcarrier n H(n), k≠l, and k, l∈X.

Similarly, the correlation formula used in method 2 for a MIMO system is modified to become method 8 for a MIMO OFDM system, which is performed in accordance with the formula:

$$\text{Corr}(k, l) = \left| \sum_{n=1}^{N} \left\langle \frac{h_k(n)}{\|h_k(n)\|}, h_l(n) \right\rangle \right| \quad \text{Equation (22)}$$

where $X = \{1, 2, \ldots K\}$, $h_k(n)$ is the $k^{th}$ row of channel matrix at subcarrier n H(n), k≠l, and k, l∈X.

The correlation formula used in method 3 for a MIM system is replaced with method 9 for a MIMO OFDM system, which is performed in accordance with the formula:

$$\text{Corr}(k, l) = \left| \sum_{n=1}^{N} \left\langle \frac{h_k(n)}{\|h_k(n)\|}, \frac{h_l(n)}{\|h_l(n)\|} \right\rangle \right| \quad \text{Equation (23)}$$

where $X = \{1, 2, \ldots K\}$, $h_k(n)$ is the $k^{th}$ row of channel matrix at subcarrier n H(n), k≠l and k, l∈X.

The correlation formula used in method 4 for a MIMO system is replaced with method 10 for a MIMO OFDM system, which is performed in accordance with the formula:

$$\text{Corr}(k, l) = \left| \sum_{n=1}^{N} \langle h_k(n), h_l(n) \rangle \right| \quad \text{Equation (24)}$$

where $X=\{1, 2, \ldots K\}$, $h_k(n)$ is the $k^{th}$ row of channel matrix at subcarrier n $H(n)$, $k \neq l$ and $k, l \in X$.

Defining the received vector at the k-th receive antenna as $y_k = [y_k(1) \, y_k(2) \ldots y_k(N)]^T$ where $y_k(n)$ is the k-th receive antenna output at the n-th subcarrier, the mutual information in the MIMO OFDM system becomes $$I(y_k; y_l) = H(y_l) - H(y_k, y_l) \quad \text{Equation (25)}$$

The block diagonal property of the MIMO OFDM channel matrix defines the mutual information to be $$I(y_k; y_l) = \sum_{n=1}^{N} H(y_k(n)) + H(y_l(n)) - H(y_k(n), y_l(n)) \quad \text{Equation (26)}$$

Hence, the mutual information-based techniques used in the MIMO systems are modified to use the following normalized mutual information and to take into account the subcarrier n. Method 5 for a MIMO system is replaced by method 11 for a MIMO OFDM system wherein:

$$I_0(y_k; y_l) = \frac{\sum_{n} I(y_k(n); y_l(n))}{\min\left(\sum_{n} H(c \cdot y_k(n)), \sum_{n} H(c \cdot y_l(n))\right)} \quad \text{Equation (27)}$$

where $y_k$ is the k-th receive vector at subcarrier n, $y_l$ is the l-th receive vector at subcarrier n, c is a constant, H is a channel matrix, $k > l$, and $k, l \in X$.

Similarly, method 6 for a MIMO system is replaced by method 12 for a MIMO OFDM system, which is performed in accordance with the formula:

$$I_0(x_k; x_l) = \frac{\sum_{n} I(x_k(n); x_l(n))}{\min\left(\sum_{n} H(c \cdot x_k(n)), \sum_{n} H(c \cdot x_l(n))\right)} \quad \text{Equation (28)}$$

where $y_k$ is the k-th receive vector at subcarrier n, $y_l$ is the l-th receive vector at subcarrier n, c is a constant, H is a channel matrix, $k > l$, and $k, l \in X$.

Figure 2:
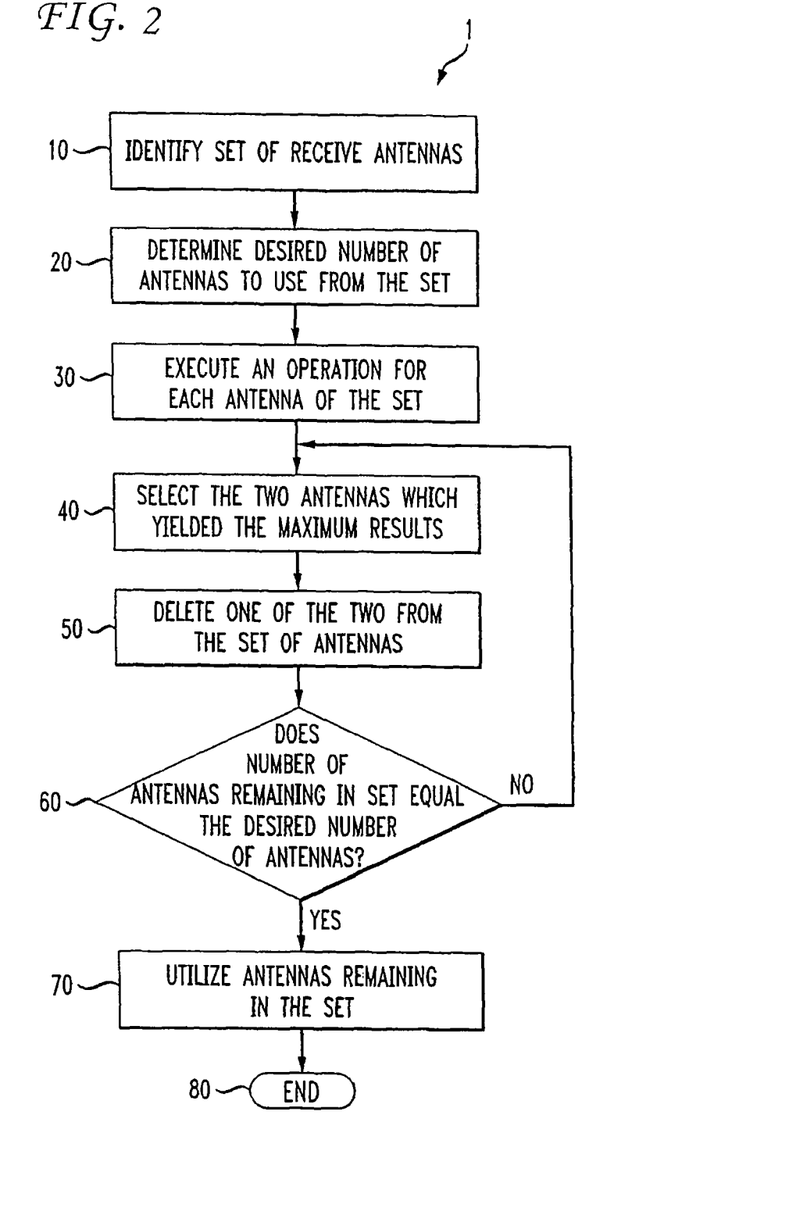
FIG. 2 is a flow chart of the present method.

Referring now to FIG. 2, a flow chart of the presently disclosed method is depicted. The rectangular elements are herein denoted "processing blocks" and represent computer software instructions or groups of instructions. The diamond shaped elements, are herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The process starts at step 10 wherein a set of receive antennas of a MIMO or MIMO OFDM receiver are identified. In the present example, the set of receive antennas comprise six antennas referred to as antenna 1-antenna 6 respectively. While a set of six receive antennas are used in this example, it should be appreciated that any number of receive antennas could be used.

The process then proceeds to step 20 where a determination is made as to the number of antennas to be used. For example, if the MIMO or MIMO OFDM receiver has a set of six receive antennas, it may be desirable to only process signals from two of the six antennas. While only two of six receive antennas are used in this example, it should be appreciated that any number of receive antennas could be used.

At step 30 an operation is executed for each antenna of the set of receive antennas. The operation may relate to determining the amount of correlation between each antenna, which each other antenna of the set, or determining an amount of mutual information between antennas of the set.

At step 40 the two antennas, which yielded the maximum results of the operation performed in step 30 are selected. In the present example, if a correlation operation was performed and it turned out that antennas 4 and 6 were the most closely correlated pair, than these two antennas are selected.

Following step 40, step 50 is executed wherein one of the two antennas (antenna 4, antenna 6) is deleted from the set of receive antennas. Therefore, either antenna 4 or antenna 6 is deleted from the set of receive antennas. Thus, initially the set of receive antennas included antennas 1-6, and antenna 4 is deleted, leaving five remaining antennas in the set of receive antennas (antennas 1-3 and 5-6).

At step 60 a determination is made as to whether the remaining set of antennas has the desired number of antennas left in the set. In this instance five antennas are remaining, while it is desired to have only two remaining, so steps 40 and 50 are executed again. Each iteration of steps 40 and 50 result in another antenna being removed from the set of receive antennas. Steps 40 and 50 are repeated until there are only two antennas remaining in the set of receive antennas. Once the desired number of antennas is left in the set of receive antennas, step 70 is executed.

At step 70, the antennas remaining in the set of receive antennas are used, and signals from these antennas are processed. The method then ends at step 80.

Figure 3:
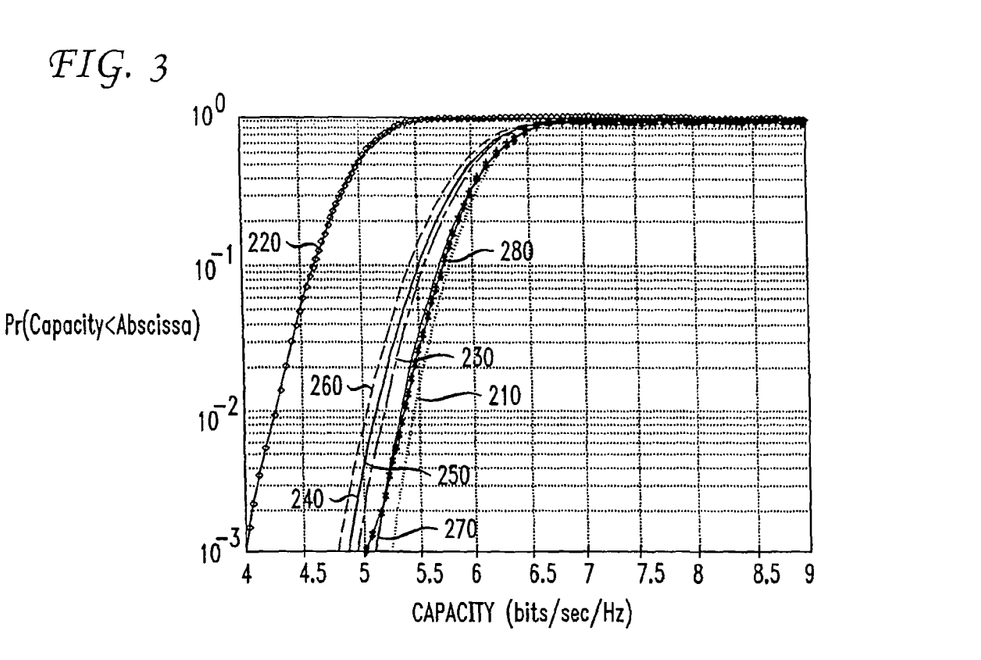
FIG. 3 is a graph of outage probability in a MIMO OFDM with an SNR of 10 db.
Figure 4:
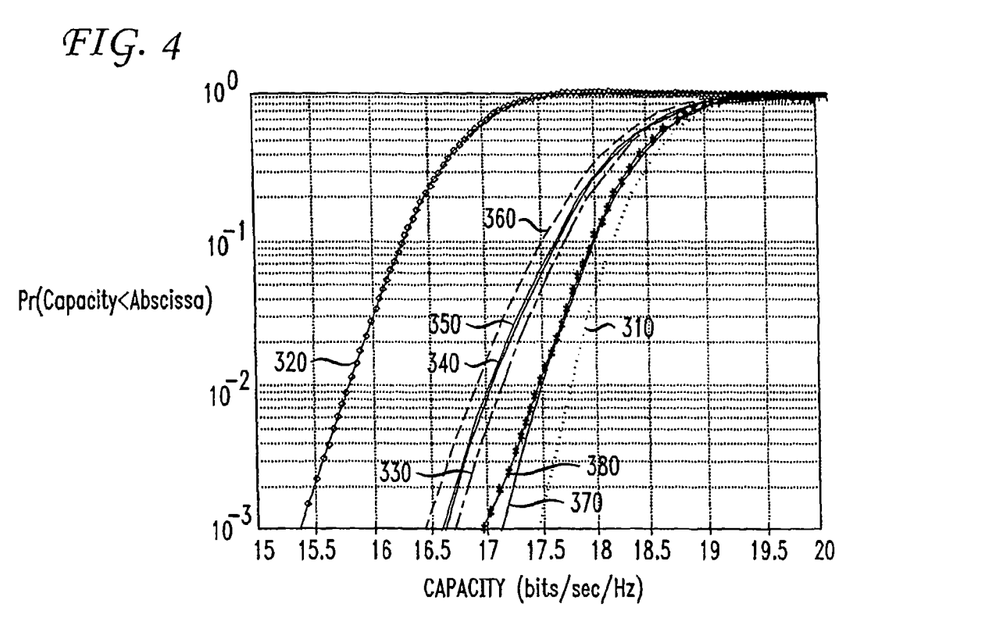
FIG. 4 is a graph of outage probability in a MIMO OFDM with an SNR of 30 db.

Referring now to FIGS. 3 and 4, the outage probability of each disclosed method in a MIMO OFDM system under frequency selective Rayleigh fading channel is shown. The number of subcarriers is 64. The maximum delay spread ($T_d$) is ¼ of the symbol duration and the r.m.s. delay spread ($T_d$) is assumed to be ¼ of the maximum delay spread with an exponential power distribution. The number of transmit and receive antennas is 2 and 6, respectively. FIG. 3 uses an SNR of 10 db, while FIG. 4 uses a SNR value of 30 db. Each method selects 2 out of 6 receive antennas. For FIG. 3, the best selection is shown by line 210, and the worst selection is shown by line 220. The selection using methods 7-12 are shown by lines 230, 240, 250, 260, 270 and 280 respectively. For FIG. 4, the best selection is shown by line 310, and the worst selection is shown by line 320. The selection using methods 7-12 are shown by lines 330, 340, 350, 360, 370 and 380 respectively. Among fast methods the mutual information based methods (methods 11 and 12) outperform the correlation-based methods (methods 7-10).

Figure 5:
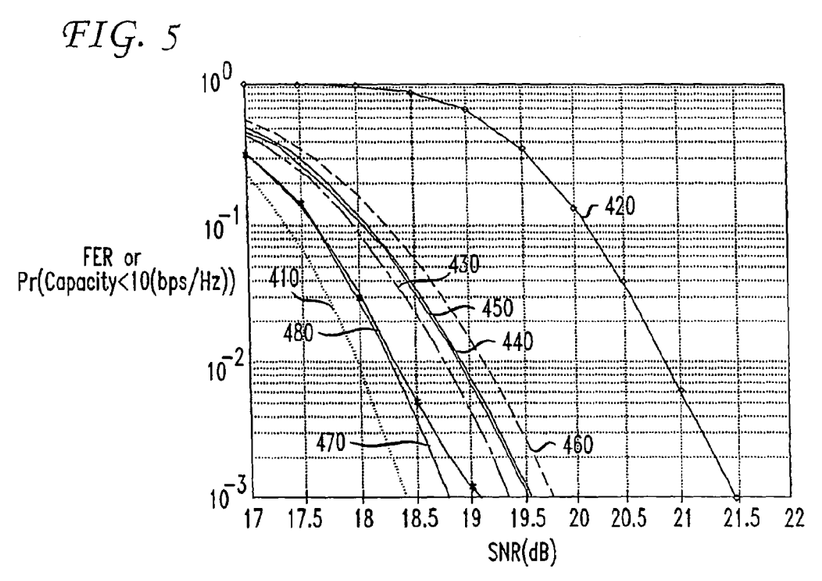
FIG. 5 is a graph of frame error rate (FER) in a MIMO OFDM.

The FER (frame error rate) is shown in FIG. 5 when the bandwidth efficiency is 10 bits/sec/Hz. The worst selection has 3 dB loss at 10 e.sup.−3 FER. Method 11 (line 470) has less than 0.5 dB loss while the correlation based methods (methods 7-10, designated by lines 430, 440, 450 and 460 respectively) exhibit from 1 to 1.5 dB loss. The performance of the fast method 12 (line 480) is comparable to or even better than that of the method 11 (line 470) at high FER while at low FER the method 12 (line 480) has similar performance with the correlation based methods (not shown). Method 12 (line 480) has good performance overall while it does not require the SNR value as in the correlation based methods.

A method of performing receive antenna selection for MIMO and MIMO OFDM systems has been described. The method executes a determination operation for a set of receive antennas, determines a maximum result of the determination operation for two of the antennas, eliminates one of the two antennas from the set of antennas, and repeats the determination and elimination process until only a predetermined number of antennas remain in the set. The signals from these remaining antennas are then processed. The present invention reduces receiver complexity and cost.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    determining, by a system comprising a processor, a plurality of correlations between different rows of a channel matrix associated with a set of receive antennas, wherein each row of the channel matrix corresponds to a receive antenna of the set of receive antennas that receives a signal comprising a plurality of subcarriers, and wherein the determining the plurality of correlations comprises determining an absolute value of an inner product of the different rows of the channel matrix averaged over the plurality of subcarriers;
    identifying, by the system, a pair of receive antennas based on the plurality of correlations;
    eliminating, by the system, one receive antenna of the pair of receive antennas from the set of receive antennas;
    determining, by the system, a number of receive antennas remaining in the set of receive antennas; and
    repeating, by the system, the identifying of another pair of receive antennas and the eliminating of one receive antenna of the another pair of receive antennas in response to the number of receive antennas remaining in the set of receive antennas being greater than a predetermined number of receive antennas.

2. The method of claim 1, further comprising determining, by the system, a low power receive antenna of the pair of receive antennas, wherein eliminating of the one receive antenna comprises removing the low power receive antenna.

3. The method of claim 1, further comprising:
    determining, by the system, a receive entropy for each receive antenna of the pair of receive antennas; and
    determining, by the system, a low entropy receive antenna of the pair of receive antennas, wherein eliminating the receive antenna comprises removing the low entropy receive antenna.

4. The method of claim 1, wherein determining the plurality of correlations between different rows of a channel matrix associated with the set of receive antennas comprises determining, by the system, a correlation for a multiple input multiple output orthogonal frequency division multiplexing system, wherein the plurality of subcarriers are subcarriers of the orthogonal frequency division multiplexing system.

5. The method of claim 1, wherein identifying a pair of receive antennas comprises identifying the pair of receive antenna having a greatest correlation of the plurality of correlations.

6. The method of claim 1, wherein identifying the pair of receive antennas comprises determining one of:
    an absolute value of an inner product of a first row of the channel matrix divided by a magnitude square of a norm of the first row of the channel matrix and a second row of the channel matrix, or
    an absolute value of an inner product of a normalized first row of the channel matrix and the second row of the channel matrix.

7. The method of claim 1, wherein identifying the pair of receive antennas comprises determining one of:
    an absolute value of an inner product of a normalized first row of the channel matrix and a normalized second row of the channel matrix, or
    an absolute value of an inner product of the first row of the channel matrix and the second row of the channel matrix.

8. A machine-readable storage device, comprising executable instructions which, responsive to being executed by a processor, cause the processor to perform operations comprising:
    determining a signal-to-interference and noise power ratio of a set of receive antennas;
    determining a plurality of correlations between different rows of a channel matrix associated with the set of receive antennas, wherein each row of the channel matrix corresponds to a receive antenna of the set of receive antennas that receives a signal comprising a plurality of subcarriers, and wherein the determining the plurality of correlations comprises determining an absolute value of an inner product of the different rows of the channel matrix averaged over the plurality of subcarriers;
identifying a pair of receive antennas based on the signal-to-interference and noise power ratio;
eliminating one receive antenna of the pair of receive antennas from the set of receive antennas; and
repeating identifying of another pair of receive antennas and eliminating of one receive antenna of the pair of receive antennas in response to a number of receive antennas remaining in the set of receive antennas being more than desired predetermined number of receive antennas.

9. The machine-readable storage device of claim 8, wherein the operation further comprise determining a low power receive antenna of the pair of receive antennas, wherein eliminating one of the receive antenna of the pair of receive antennas comprises removing the low power receive antenna from the set of receive antennas.

10. The machine-readable storage device of claim 8, wherein the operations further comprise:
determining a receive entropy for each receive antenna of the pair of receive antennas; and
determining a low entropy receive antenna of the pair of receive antennas, wherein eliminating the one receive antenna of the pair of receive antennas further comprises eliminating the low entropy receive antenna.

11. The machine-readable storage device of claim 8, wherein identifying the pair of receive antennas comprises identifying the pair of receive antennas having a greatest correlation of the plurality of correlations.

12. The machine-readable device of claim 8, wherein identifying the pair of receive antennas comprises determining one of:
an absolute value of an inner product of a first row of the channel matrix divided by a magnitude square of a norm of the first row of the channel matrix and a second row of the channel matrix, or
an absolute value of an inner product of a normalized first row of the channel matrix and the second row of the channel matrix.

13. The machine-readable storage device of claim 8, wherein identifying the pair of receive antennas having a greatest correlation from the set of receive antennas comprises determining one of:
an absolute value of an inner product of a normalized first row of the channel matrix and a normalized second row of the channel matrix, or
an absolute value of an inner product of the first row of the channel matrix and the second row of the channel matrix.

14. A device comprising:
a memory that stores executable instructions; and
a processor coupled to the memory, wherein the processor, responsive to executing the instructions, facilitates performance of operations comprising:
determining a plurality of correlations between different rows of a channel matrix associated with a set of receive antennas, wherein each row of the channel matrix corresponds to a receive antenna of the set of receive antennas that receives a signal comprising a plurality of subcarriers, and wherein the determining the plurality of correlations comprises determining an inner product of the different rows of the channel matrix averaged over the plurality of subcarriers;
identifying a pair of receive antennas based on the plurality of correlations;
eliminating one receive antenna of the pair of receive antennas from the set of receive antennas, resulting in a reduced number of receive antennas remaining in the set of receive antennas; and
repeating identifying of another pair of receive antennas and eliminating of one receive antenna of the another pair of receive antennas in response to the reduced number of receive antennas being greater than a predetermined number of receive antennas.

15. The device of claim 14, wherein the operations further comprise determining a low power receive antenna of the pair of receive antennas, wherein the eliminating of the one receive antenna comprising removing the low power receive antenna.

16. The device of claim 14, wherein the operations further comprise:
determining a receive entropy for each receive antenna of the pair of receive antennas; and
determining a low entropy receive antenna of the pair of receive antennas, wherein the eliminating of the one receive antenna comprises removing the low entropy receive antenna.

17. The device of claim 14, wherein determining the plurality of correlations between different rows of a channel matrix associated with the set of receive antennas comprises determining a correlation for a multiple input multiple output orthogonal frequency division multiplexing system, wherein the plurality of subcarriers are subcarriers of the orthogonal frequency division multiplexing system.

18. The device of claim 14, wherein identifying of the pair of receive antennas comprising identifying the pair of receive antennas having a greatest correlation of the plurality of correlations.

19. The device of claim 14, wherein identifying the pair of receive antennas comprises determining one of:
an absolute value of an inner product of a first row of the channel matrix divided by a magnitude square of a norm of the first row of the channel matrix and a second row of the channel matrix, or
an absolute value of an inner product of a normalized first row of the channel matrix and the second row of the channel matrix.

20. The device of claim 14, wherein identifying the pair of receive antennas comprises determining one of:
an absolute value of an inner product of a normalized first row of the channel matrix and a normalized second row of the channel matrix, or
an absolute value of an inner product of the first row of the channel matrix and the second row of the channel matrix.

* * * * *